(12) United States Patent
Eijkelkamp et al.

(10) Patent No.: US 11,413,774 B2
(45) Date of Patent: Aug. 16, 2022

(54) COUPLING UNIT

(71) Applicant: KONINKLIJKE PHILIPS N.V., Eindhoven (NL)

(72) Inventors: Marcus Franciscus Eijkelkamp, Peize (NL); Maurits Koenen, Eindhoven (NL); Geert Willem De Goeij, Drachten (NL); Johannes Beugels, Peize (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 397 days.

(21) Appl. No.: 16/630,005

(22) PCT Filed: Jul. 18, 2018

(86) PCT No.: PCT/EP2018/069557
§ 371 (c)(1),
(2) Date: Jan. 10, 2020

(87) PCT Pub. No.: WO2019/016288
PCT Pub. Date: Jan. 24, 2019

(65) Prior Publication Data
US 2021/0086376 A1    Mar. 25, 2021

(30) Foreign Application Priority Data

Jul. 18, 2017    (EP) .................................. 17181794

(51) Int. Cl.
*B26B 19/28* (2006.01)
*B26B 19/38* (2006.01)
(Continued)

(52) U.S. Cl.
CPC ............ *B26B 19/28* (2013.01); *B26B 19/386* (2013.01); *B26B 19/063* (2013.01); *F16D 3/18* (2013.01)

(58) Field of Classification Search
CPC ..... B26B 19/28; B26B 19/386; B26B 19/063; B26B 19/38; A61C 17/22; A61C 17/3481; A61C 8/0053; F16D 3/18
USPC ................................ 464/106, 139, 141, 903
See application file for complete search history.

(56) References Cited

U.S. PATENT DOCUMENTS 1,421,072 A    6/1922  Emet
4,582,503 A *  4/1986  Sherman, II .............. F16D 3/36
                                                    464/903
(Continued)

FOREIGN PATENT DOCUMENTS

DE    4108218         9/1992
EP    1918077 A1 *    5/2008    ............. B26B 19/14
(Continued)

OTHER PUBLICATIONS

International Search Report and Written Opinion dated Oct. 19, 2018 for International Application No. PCT/EP2018/069557 Filed Jul. 18, 2018.

*Primary Examiner* — Nhat Chieu Q Do

(57) ABSTRACT

There is disclosed a coupling unit (100) for transmission of a rotary driving force, comprising a first coupling member (110) having a curved first bearing surface (116) and a second coupling member (150) having a main coupling body (154) and a curved second bearing surface engaging the first bearing surface thereby enabling rotation of the second coupling member (150) relative to the first coupling member (110). The second coupling member comprises at least two carrying elements (158) which are each provided with a respective one of at least two second bearing surface segments (160) of the second bearing surface that engage the first bearing surface. At least two connecting elements (156) of the second coupling member (150) each connect a respective one of the at least two carrying elements (158) with the main coupling body (154) and comprise an elastically
(Continued)

deformable material. In a first deformed condition the elastically deformable material provides a first biasing force urging the at least two second bearing surface segments (160) into contact with the first bearing surface. A blocking element (120) of the first coupling member (110) is arranged between the first bearing surface (116) and the main coupling body (154) and is configured to prevent passage of the carrying elements (158) along the blocking element at least in the first deformed condition. In a second deformed condition of the elastically deformable material, wherein the elastically deformable material provides a second biasing force larger than the first biasing force, the carrying elements (158) are able to pass along the blocking element.

17 Claims, 10 Drawing Sheets

(51) Int. Cl.
B26B 19/06 (2006.01)
F16D 3/18 (2006.01)

(56) References Cited

U.S. PATENT DOCUMENTS

| | | | |
|---|---|---|---|
| 5,412,827 A * | 5/1995 | Muller | A61C 17/22 15/22.1 |
| 5,435,210 A | 7/1995 | Moore | |
| 5,651,737 A | 7/1997 | Le Blanc | |
| 2009/0144988 A1* | 6/2009 | Lau | B26B 19/3846 30/208 |
| 2011/0119930 A1* | 5/2011 | Scheunert | B26B 19/06 30/228 |
| 2012/0084983 A1* | 4/2012 | Moseman | B26B 19/28 30/42 |
| 2017/0120466 A1 | 5/2017 | Phoon | |

FOREIGN PATENT DOCUMENTS

| | | | | |
|---|---|---|---|---|
| WO | WO-2004065078 A1 * | 8/2004 | | B26B 19/14 |
| WO | WO-2005007354 A1 * | 1/2005 | | B26B 19/10 |
| WO | 2009015425 | 2/2009 | | |
| WO | WO-2015158681 A1 * | 10/2015 | | B26B 19/28 |

* cited by examiner

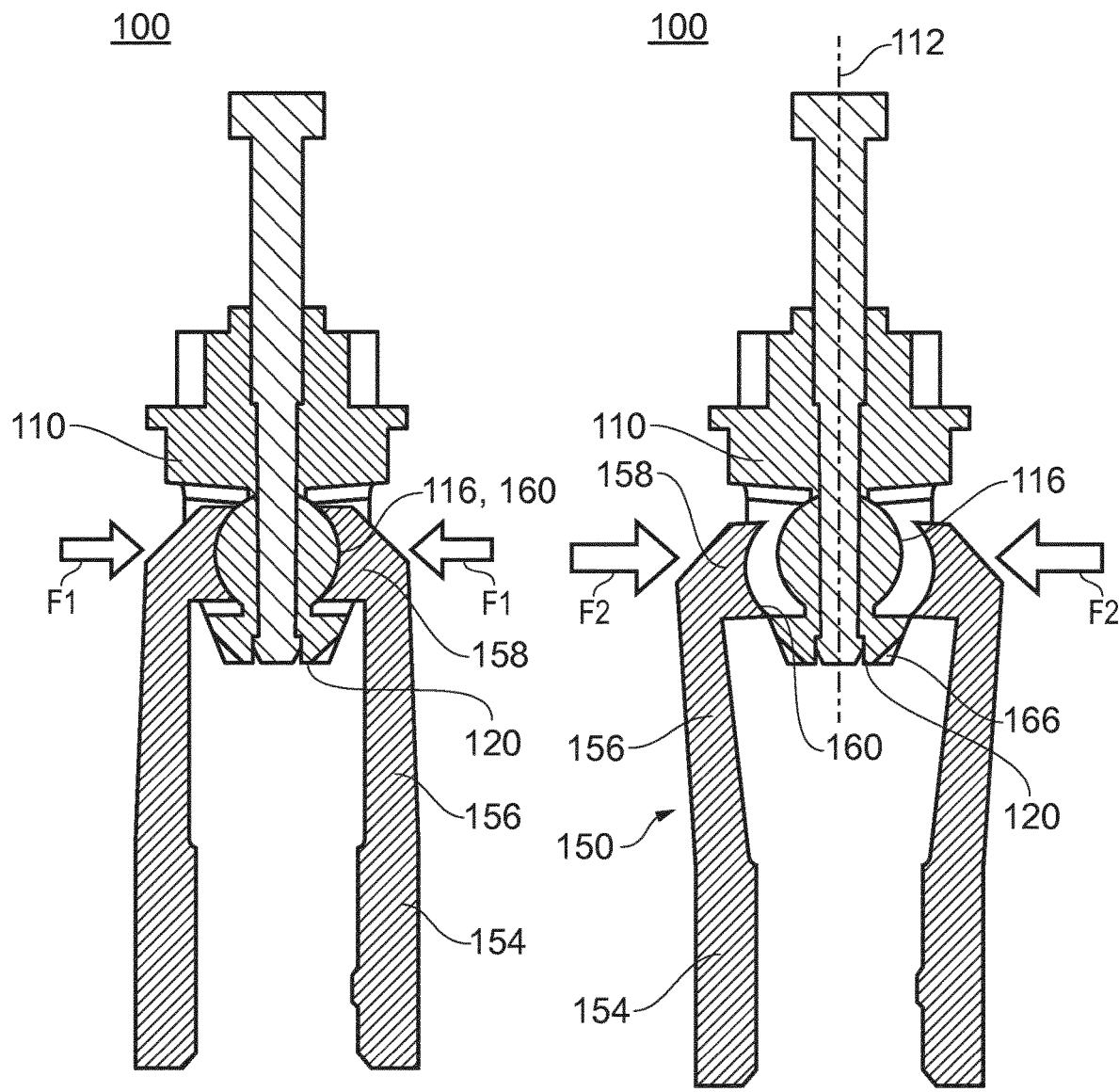

COUPLING UNIT

CROSS REFERENCE TO RELATED APPLICATIONS

This application is the U.S. National Phase application under 35 U.S.C. § 371 of International Application No. PCT/EP2018/069557 filed Jul. 18, 2018, published as WO 2019/016288 on Jan. 24, 2019, which claims the benefit of European Patent Application Number 17181794.3 filed Jul. 18, 2017. These applications are hereby incorporated by reference herein.

TECHNICAL FIELD OF THE INVENTION

The present invention relates to a coupling unit for transmission of a rotary driving force, comprising first and second coupling members provided with mutually engaging first and second bearing surfaces which enable rotation of the second coupling member relative to the first coupling member. The invention further relates to a functional attachment for a personal care device provided with a coupling unit according to the invention, and also relates to a personal care device comprising a functional attachment according to the invention.

BACKGROUND OF THE INVENTION

Known personal care devices, such as epilators, shavers or callus removal devices, comprise an actuator unit including an actuator, and a functional attachment with a personal care unit driven by the actuator. The functional attachment may be releasably coupled to the actuator unit, so that the user is able to use different functional attachments in combination with the actuator unit. In order for a rotary driving force of the actuator to be transmitted from the actuator unit to the functional attachment, it is known to provide the actuator unit with a driving member driven by the actuator and to provide the functional attachment with a rotary coupling unit which engages the driving member when the functional attachment is coupled to the actuator unit.

US 2017/0120466 discloses a hair cutting appliance having a rotary coupling unit including a male driving coupling element, driven by a drive shaft of an electric motor, and a female drivable coupling element connected to a transmission shaft. The driving coupling element and drivable coupling element are pivotable relative one another to permit non-alignment of the drive shaft and the transmission shaft, whilst providing for transmission of a rotary driving force. The driving coupling element and drivable coupling element are held together in use under an axial contact force resulting from the assembly of a cutting head on a housing with the rotary coupling unit disposed there between.

SUMMARY OF THE INVENTION

A technical object of the present invention is to provide a coupling unit for transmission of a rotary driving force as mentioned in the opening paragraph that has a simple structure and is easy to assemble whilst permitting misalignment between the coupling members of the coupling unit and an external driving member to be engaged by the coupling unit.

According to a first aspect of the invention, there is provided a coupling unit for transmission of a rotary driving force, comprising a first coupling member having a curved first bearing surface, a second coupling member having a main coupling body and a curved second bearing surface engaging the first bearing surface thereby enabling rotation of the second coupling member relative to the first coupling member, wherein the second bearing surface is arranged at a distance from the main coupling body and comprises at least two curved second bearing surface segments which each engage the first bearing surface, wherein the second coupling member comprises at least two carrying elements, which are each provided with a respective one of the at least two second bearing surface segments, and at least two connecting elements, which each connect a respective one of the at least two carrying elements with the main coupling body, wherein the first coupling member comprises a blocking element arranged between the first bearing surface and the main coupling body, wherein at least one of the at least two connecting elements comprises an elastically deformable material in a first deformed condition providing a first biasing force urging the at least two second bearing surface segments into contact with the first bearing surface, wherein the blocking element is configured to prevent passage of the at least two carrying elements along the blocking element at least in the first deformed condition of the elastically deformable material, and wherein the elastically deformable material is provided such that, in a second deformed condition of the elastically deformable material, the elastically deformable material provides a second biasing force larger than the first biasing force and the at least two carrying elements are able to pass along the blocking element.

The blocking element may be configured to also prevent passage of the at least two carrying elements along the blocking element in an un-deformed condition of the elastically deformable material wherein the elastically deformable material provides no biasing force. The un-deformed condition may correspond to the condition of the connecting elements in a disassembled configuration of the coupling unit.

Starting from a disassembled condition of the first and second coupling members, assembly of the coupling unit according to the invention may be completed simply by moving the first coupling member and the second coupling member towards each other and by simultaneously deforming the elastically deformable material into the second deformed condition, to permit the carrying elements of the second coupling member to pass along the blocking element of the first coupling member and to subsequently permit the second bearing surface segments of the second coupling member to engage the first bearing surface of the first coupling member in the first deformed condition of the elastically deformable material. When assembled, disassembly of the first and second coupling members is prevented by the blocking element. Accordingly, inadvertent disassembly of the first and second coupling members is prevented, and the second coupling member remains attached to the first coupling member in the absence of an external force, for example when the coupling unit is retained in a functional attachment of a personal care device.

As the connecting elements are in the first deformed condition when the second bearing surface segments engage the first bearing surface, separation of the first and second bearing surfaces, e.g. owing to vibrations, may be inhibited during use.

In a preferred embodiment of the coupling unit according to the invention, the blocking element comprises, at an end facing the main coupling body, at least one sloped surface facing the at least one of the at least two connecting elements comprising the elastically deformable material. During assembly of the coupling unit, the sloped surface may promote deformation of the elastically deformable material of the respective connecting element into the second deformed condition by engagement with the respective carrying element when the second coupling member is moved towards the first coupling member, so that the coupling unit may be assembled by simply moving the first and second coupling members towards each other.

In a further embodiment of the coupling unit according to the invention, the first bearing surface comprises at least two curved first bearing surface segments which each engage a respective one of the at least two second bearing surface segments. Alternatively, the first bearing surface may be configured as a single continuous bearing surface engaged by each of the at least two second bearing surface segments. The at least two first bearing surface segments may each be spherical and have a common centre point. Spherical first bearing surface segments having a common centre point may permit rotation of the second coupling member relative to the first coupling member about any axis extending through the centre point.

In a preferred embodiment of the coupling unit according to the invention, the first coupling member comprises a first central axis, the first bearing surface comprises two curved first bearing surface segments arranged diametrically opposite each other with respect to the first central axis and facing away from each other, the second coupling member comprises a second central axis, and the second bearing surface comprises two curved second bearing surface segments arranged diametrically opposite each other with respect to the second central axis and facing towards each other. In this embodiment, each of the two second bearing surface segments engages a respective one of the two first bearing surface segments, so that they remain in engagement with the first bearing surface segments when the second coupling member is rotated or pivoted with respect to the first coupling member. In this embodiment the first and second bearing surfaces allow alignment of the first and second central axes and allow the second coupling member to be pivoted relative to the first coupling member about at least one pivot axis perpendicular to the first central axis.

In a preferred embodiment of the coupling unit according to the invention, the first coupling member comprises at least one abutment element arranged to abut against at least one of the at least two carrying elements under influence of a rotary driving force exerted on the first or the second coupling member. Accordingly, a rotary driving force may be transmitted between the first and second coupling members through abutment of the respective carrying element and the abutment element. The abutment element enables a simple structure of the coupling unit. The at least one abutment element may be arranged adjacent to and protrude relative to at least one of the at least two first bearing surface segments. Accordingly, the abutment element may effectively be co-located with the first bearing surface segments, which may enable a particularly compact structure of the coupling unit permitting engagement of the first and second bearing surface segments during rotation and also permitting engagement of the carrying element and the abutment element for transmission of a rotary driving force. The first coupling member may comprise at least two abutment elements arranged to abut against a respective one of the at least two carrying elements under influence of the rotary driving force. Providing two abutment elements may improve torque transfer and mitigate against unbalanced loading when transmitting the rotary driving force.

In a preferred embodiment of the coupling unit according to the invention, the first coupling member comprises two abutment elements which are each arranged to abut against one of the at least two carrying elements under influence of, respectively, a first rotary driving force exerted on the first or the second coupling member in a first rotational direction and a second rotary driving force exerted on the first or the second coupling member in a second rotational direction opposite to the first rotational direction. This particularly simple arrangement and structure of the coupling unit permits transmission of a rotary driving force via the coupling unit in two opposite rotational directions. Said one of the at least two carrying elements may be arranged with a clearance between said two abutment elements. This particularly simple arrangement and structure of the coupling unit permits rotation of the second coupling member relative the first coupling member about the first central axis within a limited rotational range, such that there may be a degree of mechanical play between the first and second coupling members about their central axes that may facilitate the assembly of the coupling unit during manufacturing and may simplify the engagement of the coupling unit with an external driving member during use of the coupling unit.

In a preferred embodiment of the coupling unit according to the invention, the at least one of the at least two connecting elements comprising the elastically deformable material has the shape of an elongate arm. This may enable a particularly compact arrangement of the coupling unit in a direction radially to its rotational axis, and may permit easy elastic deformation of the connecting elements.

In a particular embodiment of the coupling unit according to the invention, the two second bearing surface segments are each provided on a respective one of two carrying elements, the two carrying elements are each provided on an end portion of a respective one of two connecting elements, wherein the two connecting elements each comprise the elastically deformable material, each have the shape of an elongate arm, and are arranged diametrically opposite each other with respect to the second central axis, and wherein the blocking element comprises, at an end facing the main coupling body, two sloped surfaces which are arranged diametrically opposite each other with respect to the first central axis and which each face a respective one of the two connecting elements. This arrangement of the coupling unit may enable a particularly compact structure, because the greatest elastic deformation of the connecting elements would be towards the end portions of the connecting elements. The two sloped surfaces provided on the blocking element each enable the deformation of a respective one of the two connecting elements during the assembly of the coupling unit, which enables a symmetrical deformation of the two connecting elements during the assembly of the coupling unit simplifying the assembly process.

In an embodiment of the coupling unit according to the invention, one of the first and second coupling members is provided with a receiving bush having an internal polygonal surface for receiving an external driving member having a corresponding external polygonal surface and providing a rotary driving force, and the receiving bush comprises at least three rounded protrusions which are each provided on a respective one of at least three different sections of the internal polygonal surface. The rounded protrusions may enable stable engagement of the receiving bush of the coupling unit with an external driving member having a geometrically similar shape to the receiving bush but sized so that there is a clearance between the external polygonal surface and the internal polygonal surface. The clearance may enable axial misalignment of the receiving bush and the external driving member. The clearance may also simplify receipt of the external driving member into the receiving bush when the coupling unit is being coupled to the external driving member. The three rounded protrusions allow a geometrically defined contact between the receiving bush and the external driving member received in the receiving bush, which prevents vibrations of the external driving member in the receiving bush during rotation while allowing the external driving member to be slightly misaligned relative to the receiving bush.

According to a second aspect of the invention, there is provided a functional attachment for a personal care device, comprising an attachment housing, a personal care unit which is rotatable relative to the attachment housing, and a coupling unit for receiving a rotary driving force from an external driving member and transmitting said rotary driving force to the personal care unit, wherein the coupling unit is a coupling unit according to the first aspect of the invention. The coupling unit allows the coupling of the external driving member to the personal care unit also when there is misalignment between the external driving member and a driven member of the personal care unit when the functional attachment is being coupled to the external driving member.

In a particular embodiment of the functional attachment according to the invention, the personal care unit is mounted to the attachment housing by means of an elastic suspension member. During use, the elastic suspension member may reduce or prevent the transmission of mechanical vibrations from the rotating personal care unit to the attachment housing, so that noise production of the functional attachment and mechanical vibrations of the attachment housing are reduced. The elastic suspension member may however increase the misalignment between the external driving member and the driven member of the personal care unit. The coupling unit permits this misalignment of components of the functional attachment (such as the driven member of the gearbox) and the external driving member of the personal care device to which the functional attachment is to coupled or attached.

In an embodiment of the functional attachment according to the invention, the personal care unit comprises a rotatable epilation system, a rotatable hair-cutting system, or a rotatable callus-removal system.

According to a third aspect of the invention, there is provided a personal care device comprising an actuator unit and a functional attachment in accordance with the second aspect of the invention, wherein the actuator unit accommodates an actuator, which is connected to a rotatable driving member to provide a rotary driving force to the driving member, and a first coupling structure, wherein the functional attachment has a second coupling structure which can be coupled to and released from the first coupling structure, and wherein the coupling unit of the functional attachment is configured to receive the rotary driving force from the rotatable driving member when the second coupling structure is coupled to the first coupling structure.

BRIEF DESCRIPTION OF THE DRAWINGS

Embodiments of the present invention will now be described, by way of example, with reference to the accompanying drawings, in which:

FIG. 10 shows a cross-section of the coupling unit of FIG. 3 in the assembled configuration;

FIG. 11 shows a cross-section of the coupling unit of FIG. 3 in a connection configuration;

DETAILED DESCRIPTION OF THE PREFERRED EMBODIMENTS

Figure 1:
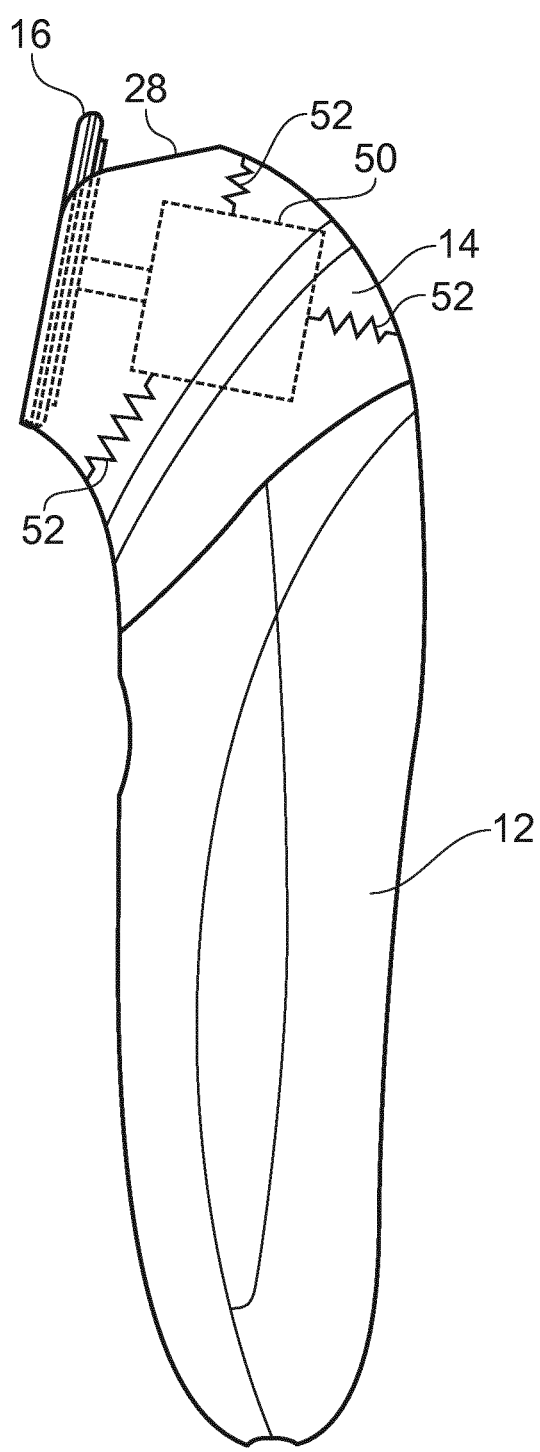
FIG. 1 shows a side view of a personal care device according to the invention.

FIG. 1 shows a personal care device 10, which in this example is a callus removal device. The personal care device comprises an actuator unit 12 in the form of a handle and a functional attachment 14 (or "head"), which in this example comprises a callus removal unit comprising a rotatable callus removal disc 16.

In this example, the callus removal unit is mounted within an attachment housing 28 of the functional attachment 14 by way of an elastic suspension member. In particular, rotational components of the callus removal unit, which drive and support the rotatable callus removal disc 16 such as a gearbox 50, are mounted within the attachment housing 28 by one or more elastic suspension members 52 acting between the attachment housing 28 and the gearbox 50. The elastic suspension members 52 are only schematically illustrated as mechanical springs in FIG. 1, but may take any suitable form as known the person skilled in the art. The elastic suspension members 52 prevent the transmission of mechanical vibrations from the callus removal unit to the attachment housing 28 and further into the actuator unit 12.

The functional attachment 14 is detachably attachable to the actuator unit 12. In particular, the actuator unit 12 comprises a first coupling structure, and the functional attachment 14 comprises a cooperating second coupling structure. For example, the first and second coupling structures may comprise snap-fit co-operating latches provided with a release member that can be operated by the user, such as a release button to disengage the latches. Accordingly, in this example the functional attachment 14 is retained on the actuator unit 12 in use by the co-operating first and second coupling structures. By detaching the functional attachment 14 from the actuator unit, a user may exchange the functional attachment 14 by a different functional attachment, for example a hair removal attachment.

Figure 2:
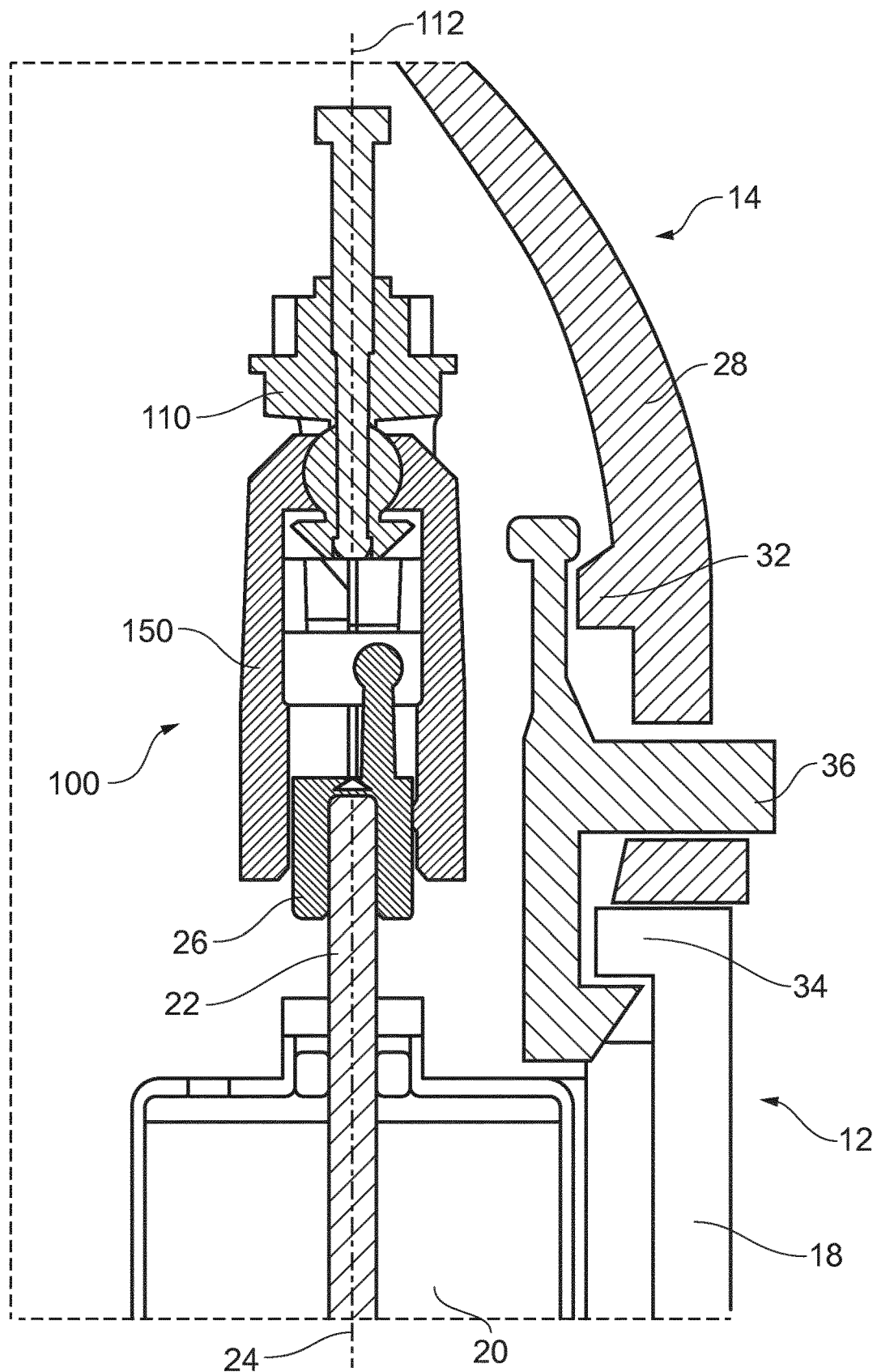
FIG. 2 shows a partial cross-section of the personal care device of FIG. 1 including a coupling unit according to the invention.

FIG. 2 shows a partial cross-sectional side view of the personal care device 10. As shown, the actuator unit 12 comprises a main housing 18 and an actuator 20 accommodated in the main housing 18. In this example, the actuator is a rotary motor, for example an electric rotary motor powered by a removable power source, such as a battery received in a battery compartment of the actuator unit 12. The actuator 20 comprises a rotational drive shaft 22 configured to rotate around a central actuator axis 24.

The rotational drive shaft 22 extends axially beyond a body of the actuator 20, and a rotatable driving member 26 is mounted on an end portion of the drive shaft 22. The rotatable driving member 26 is mounted on the rotational drive shaft 22 so as to rotate together with the rotational drive shaft 22. In this particular example, the rotatable driving member 26 is keyed with the rotational drive shaft 22, but in other examples it may be mounted by other means, for example by a mechanical fastener, adhesive, or it may be integrally formed together with the drive shaft 22. The rotatable driving member 26 will be described in further detail below, with reference to FIG. 12.

FIG. 2 further shows components of the functional attachment 14. The functional attachment 14 comprises an attachment housing 28 which is detachably attached to the main housing 18. In this particular example, the main housing 18 of the actuator unit 12 comprises a first coupling structure 34 in the form of a latch portion extending into the actuator unit 12, and the attachment housing 28 comprises a co-operating second coupling structure 32 in the form of a latch portion extending into the functional attachment 14. In the example shown in FIG. 2, the first and second coupling structures 34, 32 co-operate with a latch element 36, so that the first and second coupling structures can be coupled to each other. In this particular example, the latch element 36 is attached to a release button and biased to engage the first and second coupling structures 34, 32 to prevent removal of the functional attachment 14 from the actuator unit 12. The release button can be depressed by a user to enable the disengagement of one or both of the first and second coupling structures 34, 32 from the latch element 36, to permit manual removal of the functional attachment 14 from the actuator unit 12. In other examples, the first and second coupling structures may cooperate to directly engage one another, for example by snap-fit assembly.

As shown in FIG. 2, the functional attachment 14 further comprises a coupling unit 100 for transmission of a rotary driving force from the rotatable driving member 26 of the actuator unit 12 to rotatable components of the functional attachment 14, such as a gearbox. The coupling unit 100 comprises a first coupling member 110 coupled to said rotatable components of the functional attachment 14 (such as gearbox 50 schematically shown in FIG. 1), and a second coupling member 150 coupled to the first coupling member 110 and configured to receive the rotatable driving member 26 of the actuator unit 12.

With the functional attachment 14 attached to the actuator unit 12 as shown in FIG. 2, the coupling unit 100 is configured and arrangement such that the second coupling member 150 can receive a rotary driving force from the rotatable driving member 26 and transmit the rotary driving force to the first coupling member 110 to thereby drive said rotatable components of the functional attachment 14, as will be described in detail below.

In this example, the first coupling member 110 is mounted in the functional attachment 14 so that it is prevented from any substantial pivoting or translational movement with respect to the gearbox 50, and is only permitted to rotate about a first central axis 112 of the first coupling member 110. In other words, the first coupling member 110 has one (in this case, only one) degree of freedom with respect to the gearbox 50, which is rotation about the first central axis 112.

In this example, the second coupling member 150 is moveable relative the first coupling member 110, so that non-alignment between the first central axis 112 and the central actuator axis 24 can be accommodated. In this particular example, the second coupling member 150 is attached to the first coupling member 110 for rotation about the first central axis 112 within a very limited angular range, and for pivoting movement about an axis orthogonal to the first central axis 112.

Figure 3:
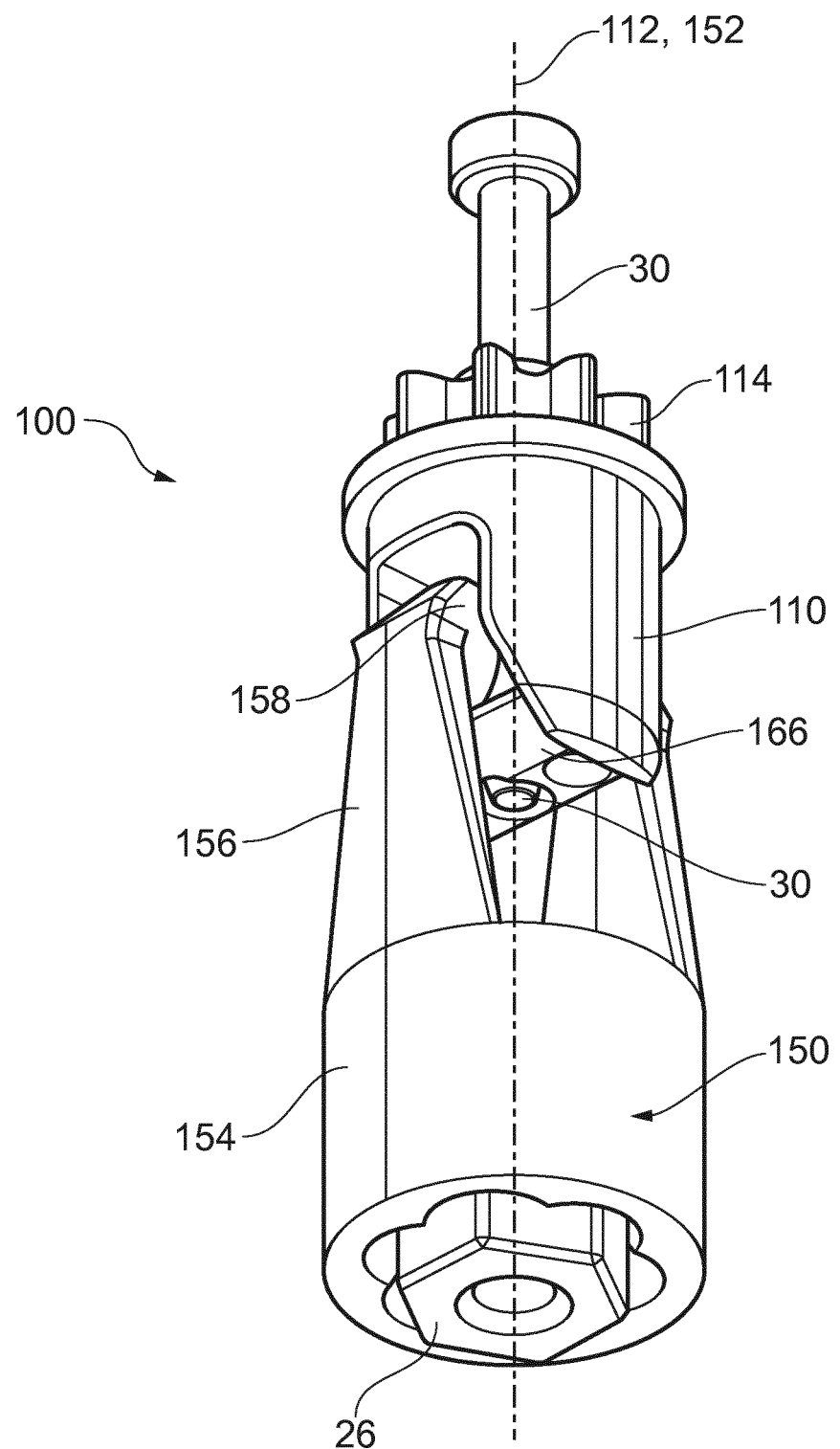
FIG. 3 shows a perspective view of the coupling unit of the personal care device of FIG. 2 in isolation, in an assembled configuration.
Figure 4:
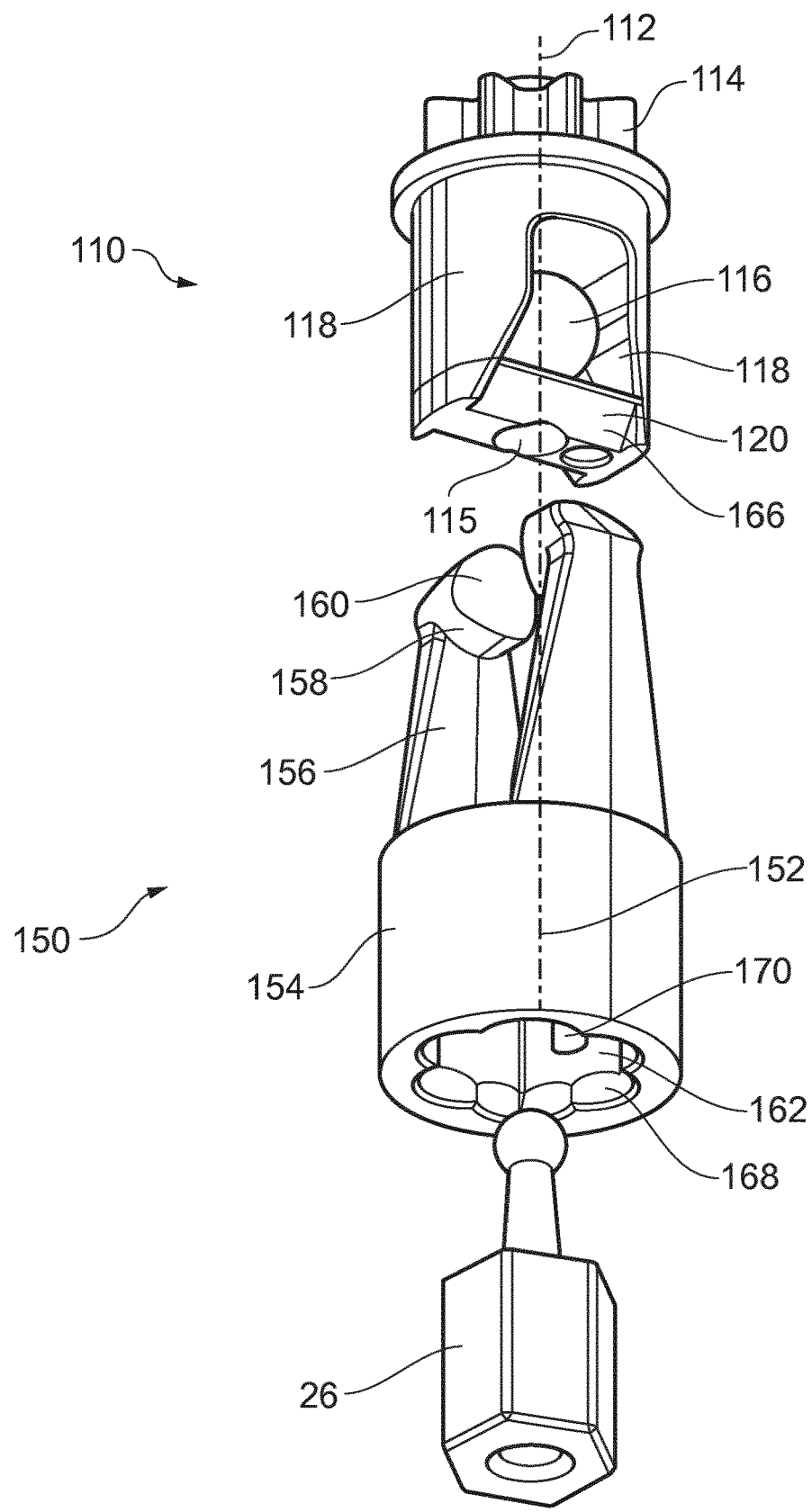
FIG. 4 shows a perspective view of the coupling unit of FIG. 3 in a disassembled configuration.

FIGS. 3 and 4 show perspective views of the coupling unit 100 in isolation from other components of the functional attachment 14 (such as gearbox 50 and attachment housing 28) in assembled and disassembled configurations respectively, together with the rotatable driving member 26 of the actuator unit 12, as will be described in detail below.

The first and second coupling members 110, 150 are each rotatable about respective first and second central axes 112, 152 and have cooperating first and second bearing surfaces configured to mutually engage in the assembled configuration to permit movement of the second coupling member 150 relative the first coupling member 110 as briefly set out above (in particular pivoting and rotational movement). It is noted that in FIG. 3 the first and second coupling members 110, 150 are shown in mutual positions wherein the first and second central axes 112, 152 coincide.

The particular shape and configuration of the cooperating first and second coupling members may vary without affecting their cooperative functional performance. The following description relates to a particular example of such cooperating first and second coupling members.

The first coupling member 110 generally extends along the first central axis 112 from a proximal end, where the first coupling member 110 is mounted to other rotatable components of the functional attachment 14, such as gearbox 50 not shown in FIGS. 3 and 4, to a distal end towards the second coupling member 150. In this particular example, the proximal end comprises a gear 114 for engaging other rotatable components of the functional attachment 14.

In this example, the first coupling member 110 comprises a bore 115 extending along the first central axis 112 for receiving a rotation pin 30 by which the first coupling member 110 is mounted in the functional attachment 14, in particular journaled with respect to the gearbox 50, but in other examples a rotation pin may be integrally provided with the first coupling member 110.

In this example, the first coupling member 110 has a generally cylindrical outer profile extending about the first central axis 112, with angularly spaced recesses in which the first coupling member 110 has segments of the curved first bearing surface. In particular, the first coupling member 110 comprises a curved first bearing surface comprising two convex curved first bearing surface segments 116. The first bearing surface segments 116 are spherical, i.e. they constitute the curved surface of respective spherical segments, with a common spherical radius and centre aligned with the first central axis 110. In this example, there are two first bearing surface segments 116 diametrically opposed to one another with respect to the first central axis 112 so as to face away from one another. It is noted that in FIG. 4 only one of the two first bearing surface segments 116 is visible.

The first coupling member 110 comprises two abutment elements 118 angularly separating the respective first bearing surface segments 116. In particular, the abutment elements 118 are adjacent to and protrude relative to the first bearing surface segments 116. In this example, the first bearing surface segments 116 are arranged within the recesses of the first coupling member 110, so that the abutment elements 118 extend radially beyond the first bearing surface segments 116 and are partly defined by walls of the respective recesses. In particular, the abutment elements 118 comprise un-recessed portions of the first coupling member 110 arranged between the respective first bearing surface segments 116, which protrude relative to the respective first bearing surface segments 116.

The first coupling member 110 further comprises a blocking element 120 towards its distal end, as will be described in detail below with respect to FIGS. 10 and 11 in the context of its cooperation with the second coupling member 150.

The second coupling member 150 comprises a main coupling body 154, which is generally cylindrical and rotatable about the second central axis 152. The main coupling body 154 comprises a receiving bush 162 for receiving the rotatable driving member 26. In this example, the receiving bush 162 has an internal polygonal surface, e.g. a six-sided surface, and the rotatable driving member 26 has a corresponding, geometrically similar external polygonal surface. Cooperating features of the receiving bush 162 and the rotatable driving member 26 will be described below with respect to FIG. 12.

The second coupling member 150 further comprises a plurality of connecting elements 156 extending from the main coupling body 154, each connecting element 156 supporting a respective carrying element 158 comprising a respective second bearing surface segment 160 of the second coupling member 150. Accordingly, the second bearing surface defined by the second bearing surface segments 160 is at a distance from the main coupling body 154. The plurality of connecting elements 158 may comprise two or more connecting elements 158, for example two connecting elements or four connecting elements. In this example, there are two connecting elements 158 diametrically opposed with respect to each other with respect to the second central axis 152. In other examples, there may be more then two connecting elements, such as four connecting elements at equal angular intervals of 90° with respect to the second central axis 152. The number of connecting elements may correspond to the number of carrying elements and second bearing surface segments (and first bearing surface segments), as will be apparent from the following description.

In this example, the connecting elements 158 are each elastically deformable (i.e. resilient), by virtue of comprising an elastically deformable material, such as a resilient polymer (e.g. polyoxymethylene ("POM") or polytetrafluoroethylene ("PTFE")). In other examples, at least one of the connecting elements may be elastically deformable.

In this example, the connecting elements 156 are each in the form of a generally elongate arm extending along a direction parallel with the second central axis 152 and arranged at angularly-spaced radial locations away from the second central axis 152. More particularly, in this example the connecting elements 156 extend from a peripheral region of the main coupling body 154.

Each carrying element 158 supported on a respective one of the connecting elements 156 extends radially inwardly with respect to the associated connecting element 156 to define the respective second bearing surface segment 160 at the radially inner end of the respective carrying element 158, so that the second bearing surface segments 160 are concave and face towards each other and towards the second central axis 152. In this example, there are two second bearing surface segments 160 diametrically opposed to one another with respect to the second central axis 152 and configured to engage respective ones of the first bearing surface segments 116.

In this example, the first bearing surface segments 116 are spherical and the corresponding second bearing surface segments 160 are cylindrical, i.e. the second bearing surface segments 160 correspond to a portion of a cylindrical wall. In particular, the second bearing surface segments 160 are cylindrical about a transverse axis that intersects and is orthogonal to the second central axis 152 in the assembled configuration. Accordingly, the second bearing surface segments 160 are configured to engage the first bearing surface segments 116 along an arcuate line extending around said transverse axis. In other examples, the second bearing surface segments may have a different shape, for example they may be spherical to correspond to spherical first bearing surface segments 116, such that the second bearing surface segments 160 engage the first bearing surface segments 116 over a spherical area.

Figure 5:
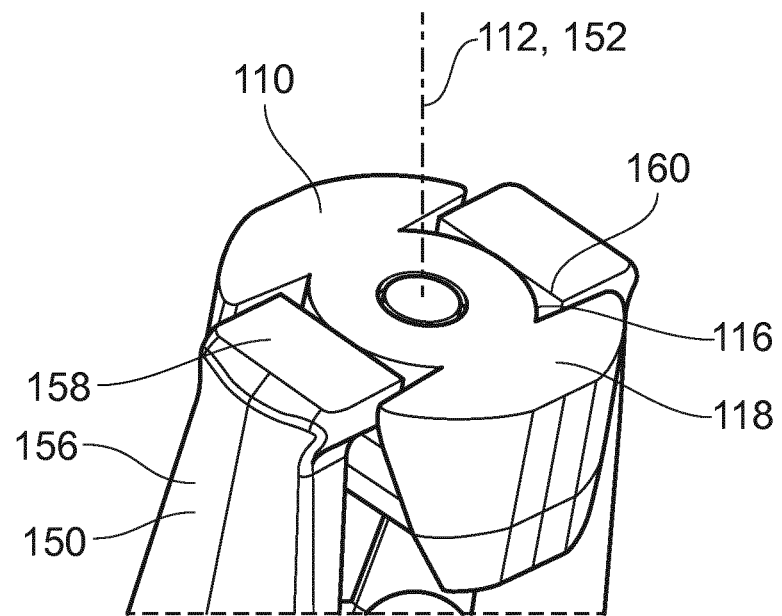
FIG. 5 shows an axial cross-section of the coupling unit of FIG. 3 in the assembled configuration.
Figure 6:
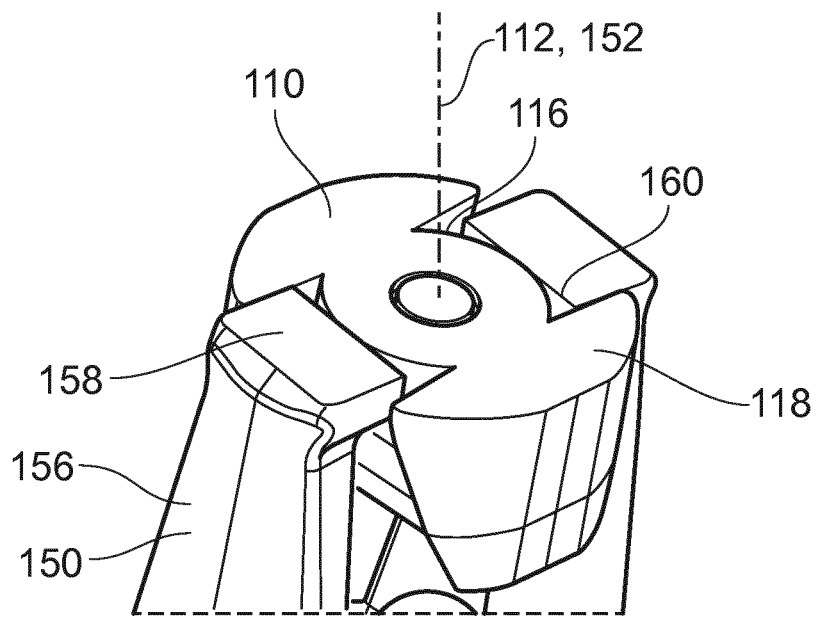
FIG. 6 shows an axial cross-section of the coupling unit of FIG. 3 in the assembled configuration, in an abutment condition.

FIGS. 5 and 6 show the first and second coupling members 110, 150 in a cross-section perpendicular to the first and second central axes 112, 152 wherein the second bearing surface segments 160 provided on the carrying elements 158 engage the first bearing surface segments 116 in the assembled configuration. The carrying elements 158 extend into the recesses of the first coupling member 110 towards the respective first bearing surface segments 116, so that the second bearing surface segments 160 engage the respective first bearing surface segments 116 and so that each carrying element 158 is angularly disposed between two abutment elements 118 arranged on either side of the first bearing surface segments 116. In the assembled configuration, there is an angular clearance between each carrying element 158 and the adjacent abutment elements 118, such that the second coupling member 150 can rotate relative the first coupling member 110 about the first central axis 112 by an amount corresponding to said angular clearance. For example, the angular clearance may be approximately 5° on either side of the carrying elements 158 when the first and second central axes 112, 152 are coaxially arranged.

FIG. 5 shows the second coupling member 150 in a first rotational position about the first central axis 112 relative to the first coupling member 110, in which each carrying element 158 is positioned with a clearance relative to each adjacent abutment element 118. FIG. 6 shows the second coupling member 150 in a second rotational position about the first central axis 112 relative to the first coupling member 110 in which the second coupling member 150 has rotated about the first central axis 112 such that each carrying element 158 is in abutment with a respective one of the abutment elements 118. In this second rotational position, the first and second coupling members 110, 150 are configured to transmit a rotary driving force there between by abutment of the carrying elements 158 and the respective abutment elements 118. As will be appreciated, each carrying element 158 would abut a respective one of the abutment elements 118 when the second coupling member 150 is rotated relative to the first coupling member 110 (i.e. about the first central axis 112) in either of a first rotational direction about the first central axis 112 and an opposite second rotational direction about the first central axis 112. Although in this example both carrying elements 158 engage a respective abutment element 118, in other embodiments there may be only be a single abutment element.

The second coupling member 150 is also pivotable relative to the first coupling member 110 when in the assembled configuration. In particular, the second coupling member 150 is pivotable relative to the first coupling member 110 about a pivot axis which is orthogonal to the first central axis 112. As in this example the first bearing surface segments 116 are spherical, the second coupling member 150 is pivotable about any pivot axis orthogonal to the first central axis 112. In other examples, the first bearing surface segments may be curved differently so as to limit the number of pivot axes about which the second coupling member is rotatable relative to the first coupling member. For example, when the first bearing surface segments are cylindrical, the second coupling member would be pivotable about a single pivot axis only relative to the first coupling member corresponding to the axis of the cylinder.

As shown in FIGS. 5 and 6, the abutment elements 118 are tapered to permit said pivoting movement of the second coupling member 150 relative the first coupling member. A range of the relative rotational movement between the first and second coupling members 110, 150 about the first central axis 112, enabled by the angular clearance between the carrying elements 158 and the abutment elements 118, may be at a maximum when the first and second central axes 112, 152 are coaxial, and may reduce as the second coupling member 150 is pivoted relative the first coupling member 110.

Figure 7:
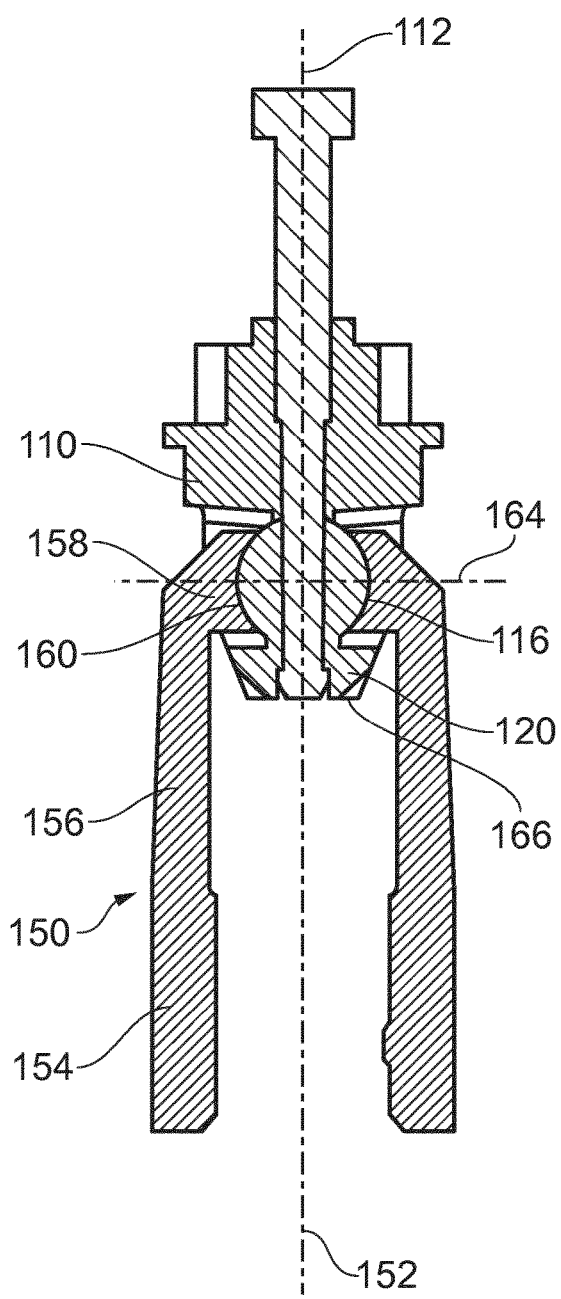
FIG. 7 shows a cross-section of the coupling unit of FIG. 3 in the assembled configuration.
Figure 8:
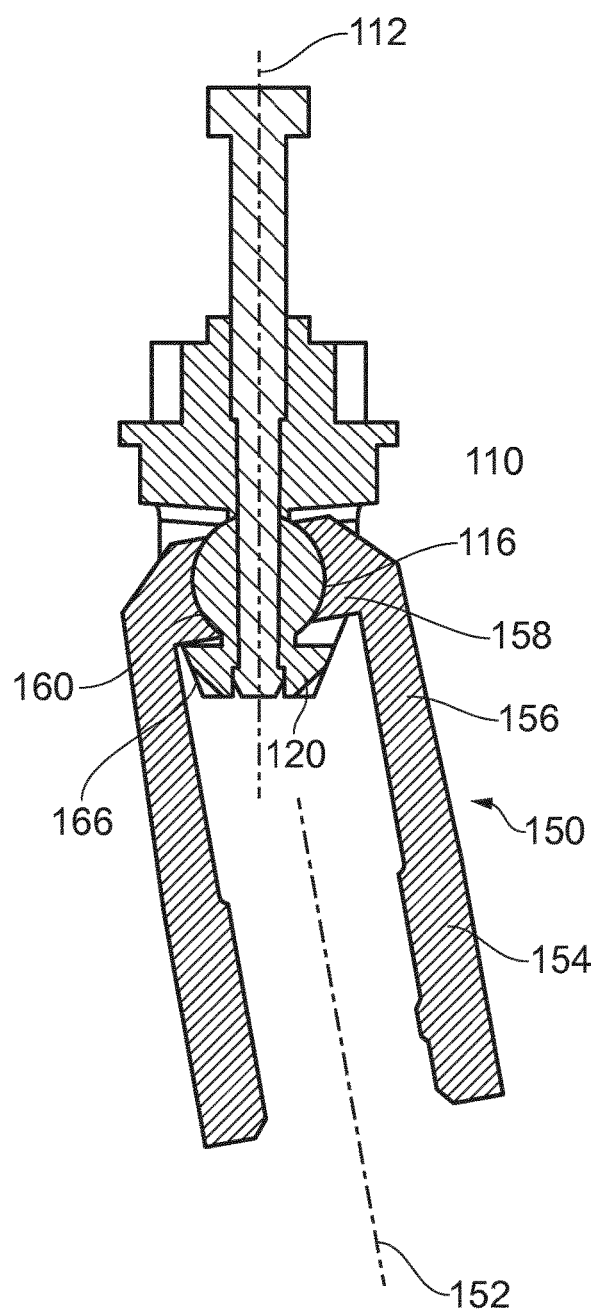
FIG. 8 shows a cross-section of the coupling unit of FIG. 3 in the assembled configuration in a pivoted condition.

FIGS. 7 and 8 show cross-sectional views of the first and second coupling members 110, 150 along a plane comprising the first central axis 112 and an orthogonal transverse axis 164 extending between the first bearing surface segments 116. FIG. 7 shows the first and second coupling members 110, 150 in the assembled configuration and aligned with respect to each other, such that the first and second central axes 112, 152 are coaxial. FIG. 8 shows the first and second coupling members 110, 150 in a pivoted condition in which the second coupling member 150 is pivoted relative to the first coupling member 110 about a pivot axis orthogonal to the first central axis 112 and orthogonal to the transverse axis 164.

Figure 9:
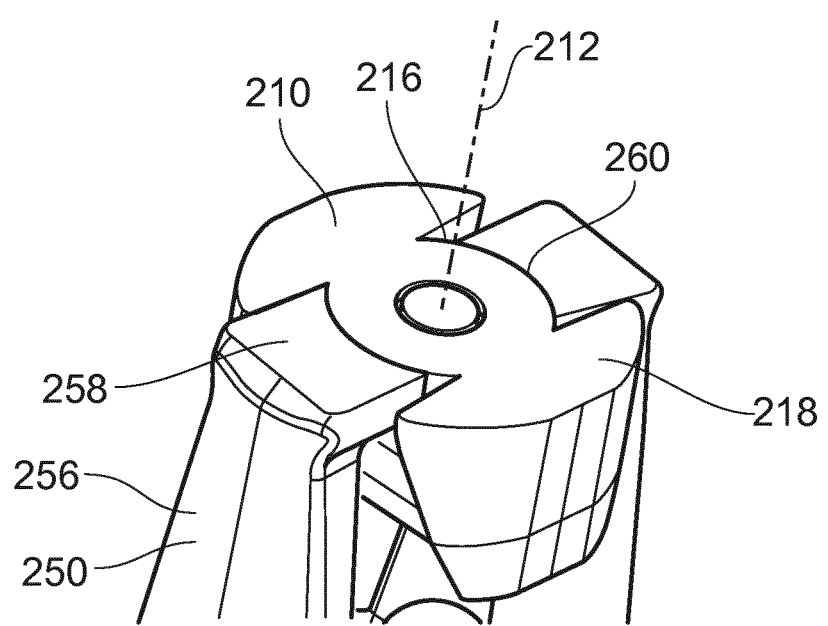
FIG. 9 shows an axial cross-section of an alternative embodiment of a coupling unit according to the invention in an assembled configuration.

FIG. 9 shows an alternative embodiment of a coupling unit according to the invention comprising a first coupling member 210 and a second coupling member 250 in a cross-section corresponding to the cross-section shown in FIGS. 5 and 6. The first and second coupling members 210, 250 of the alternative embodiment of the coupling unit correspond to those described above with respect to the first embodiment shown in FIGS. 2-6, except that the second bearing surface segments 260 are spherical so as to engage the first bearing surface segments 116 over a spherical contact area. FIG. 9 shows the alternative embodiment of the coupling unit in the assembled configuration with the second coupling member 250 rotated with respect to the first coupling member 210 about the first central axis 212 of the first coupling member 210 such that the connecting elements 258 of the second coupling member 250 abut the abutment elements 218 of the first coupling member 210. Further, the second coupling member 250 is pivoted relative the first coupling member 210 about a pivot axis orthogonal to the first central axis 212 such that the first and second coupling members 210 and 250 are tilted with respect to each other.

As described above, the connecting elements 156 comprise an elastically deformable material. In this example, as shown in FIG. 4, in the disassembled configuration of the coupling unit 100 the connecting elements 156 are biased to an un-deformed condition in which the carrying elements 158 provided on the connecting elements 156 are closer to the second central axis 152 than in the assembled configuration of the coupling unit 100. In this example, the connecting elements 156 are biased to close towards the un-deformed condition when they are flexed away from the second central axis 152. As is apparent from the following description, in this example the connecting elements 156 are only permitted to return to the un-deformed condition when the first and second coupling members 110, 150 are disassembled (FIG. 4).

First and second deformed conditions of the connecting elements 156 will now be described with reference to FIGS. 10 and 11, which respectively show the assembled configuration of the coupling unit 100 and a connection configuration of the first and second coupling members 110, 150.

FIG. 10 shows the first and second coupling members 110, 150 in the assembled configuration, and is a reproduction of FIG. 7 for side-by-side comparison with the connection configuration of FIG. 11. In the assembled configuration of the coupling unit 100 shown in FIG. 10, the connecting elements 156 are elastically deformed into a first deformed condition such that the elastically deformable material of the connecting elements 156 provides a first biasing force $F_1$ urging the carrying elements 158 and second bearing surface segments 160 to engage the corresponding first bearing surface segments 116. The first biasing force $F_1$ may mitigate noise owing to vibration during use. When the coupling unit 100 is in the assembled configuration, the connecting elements 156 are prevented from reaching the un-deformed condition by the first bearing surface segments 116 of the first coupling member 110.

Further, in the assembled configuration, the blocking element 120 at the distal end of the first coupling member 110 is disposed between the carrying elements 158 and the main coupling body 154, as shown in FIG. 3. The blocking element 120 is in the form of a head having a tapered distal end and a proximal shoulder. In this example, the head has a substantially constant cross section in the form of an arrowhead along an axis orthogonal to the first central axis 112 and orthogonal to the transverse axis extending between the two first bearing surface segments 116. The proximal shoulder is configured to engage and abut the carrying elements 158 when the second coupling member 150 is moved axially relative the first coupling member 110 along a disengaging direction parallel with the first central axis 112 and away from the first coupling member 110. In particular, the proximal shoulder is configured to abut and stop the carrying elements 158, and presents a planar surface that does not promote the carrying elements 158 to ride over the shoulder (i.e. by spreading the elongate arms of the connecting elements 156). Accordingly, the blocking element 120 inhibits disassembly of the first and second coupling members 110, 150.

As the connecting elements 156 are in a deformed condition in the assembled configuration, the resultant first biasing force $F_1$ may promote constant mutual engagement of the first and second bearing surface segments 116, 160, which may serve to reduce noise during operation of the coupling unit 100.

FIG. 11 shows the coupling unit 100 in a connection configuration between the disassembled configuration (as shown in FIG. 4) and the assembled configuration of the first and second coupling members 110, 150 (as shown in FIG. 10). The tapered distal end of the blocking element 120 comprises sloping surfaces 166, which face the main coupling body 154 of the second coupling member 150 in the assembled configuration of the coupling unit 110. The sloping surfaces 166 are configured and arranged in such a way that they are able to engage the carrying elements 158 when the connecting elements 156 of the second coupling member 150 are in the un-deformed condition as shown in FIG. 4. As a result, when the first and second coupling members 110, 150 are moved towards each other in a direction along the first central axis 112 starting from the disassembled configuration of the coupling unit 110, the carrying elements 158 are brought into abutment with the respective sloping surfaces 166 of the blocking element 120. By pushing the first and second coupling members 110, 150 further towards each other, the carrying elements 158 will engage with the sloping surfaces 166 of the blocking element 120 such that the carrying elements 158 glide over the sloping surfaces 166 of the blocking element 120, thereby causing the connecting elements 156 to deform from the un-deformed condition into a second deformed condition wherein the elastically deformable material of the connecting elements 156 provides a second biasing force $F_2$, as shown in FIG. 11, which is larger than the first biasing force $F_1$ provided in the first deformed condition. In said second deformed condition, the connecting elements 156 are moved away from each other sufficiently to receive the blocking element 120 between the carrying elements 158, so as to permit the carrying elements 158 to pass along (in this embodiment, pass around) the blocking element 120 at the distal end of the first coupling member 110. In the second deformed condition of the connecting elements 156, the second biasing force $F_2$ acting on the connecting elements 156 is larger than the first biasing force $F_1$ acting on the connecting elements 156 in the first deformed condition of the connecting elements 156, i.e. in the second deformed condition the connecting elements 156 are elastically deformed relative to their un-deformed condition by a greater degree than in the first deformed condition. It is noted that, as the skilled person will understand, in this context the term "elastically deformed" implies that, by taking away any forces counteracting the first and second biasing forces $F_1$, $F_2$ in, respectively, the first and second deformed conditions, the connecting elements 156 will generally return in the un-deformed condition without any substantial permanent, i.e. plastic deformation.

Accordingly, as shown in FIG. 11, in the second deformed condition of the connecting elements 156 the carrying elements 158 are permitted to pass along the blocking element 120, so that the second bearing surface segments 160 can be moved into engagement with the first bearing surface segments 116 in order to bring the coupling unit 100 into the assembled configuration. As will be appreciated, the connecting elements 156 adopt a range of deformed conditions as the carrying elements 158 pass over the blocking element 120 and over portions of the first bearing surface segments 116 to reach the assembled configuration. The sloping surfaces 166 of the blocking element 120 are therefore configured to engage the carrying elements 158 during assembly of the coupling unit 100 such as to flex the connecting elements 156 away from each other and to thereby permit assembly. The blocking element 120 is further configured to abut, stop and thereby block the carrying elements 158 upon application of a disassembling force, i.e. a force pulling the first and second coupling members 110, 150 apart in a direction along their central axis 112, 152, such as to prevent the connecting elements 156 from flexing away from each other, thereby inhibiting disassembly of the coupling unit 100. In order to disassemble the first and second coupling members 110, 150, it would for example be necessary to manually deform one or both of the connecting elements 156 to permit the carrying elements 158 to pass over the blocking element 120.

In other examples, the blocking element may have fewer or more sloping surfaces. For example, the blocking element may have at least one sloping surface configured to engage a respective one of the carrying elements to cause it to move to the connection configuration during assembly.

The particular arrangement of the coupling unit 100 described above is exemplary only, and in other embodiments the first and second coupling members of the coupling unit may be configured differently. In particular, in an alternative embodiment the first coupling member may comprise concave first bearing surface segments arranged within a common cavity of the first coupling member and configured to receive cooperating carrying elements of a second coupling member having respective convex second bearing surface segments. In this alternative embodiment, the first bearing surface segments may be arranged to face each other in the common cavity, while the second bearing surface segments may be arranged to face away from each other. The first coupling member may comprise abutment elements which extend beyond the first bearing surface segments to abut with the carrying elements. In such an alternative embodiment, in the disassembled configuration of the coupling unit the connecting elements of the second coupling member may be biased to an un-deformed configuration in which the carrying elements are spaced apart such that they cannot pass along an opening of the common cavity and further into the common cavity. In this alternative embodiment, the connecting elements may adopt a first deformed condition when received in the common cavity of the first coupling member, i.e. in an assembled configuration of the coupling unit such that the second bearing surface segments engage the first bearing surface segments, in which first deformed condition they may be flexed towards each other by a first degree against a first biasing force. Further, to reach the assembled configuration starting from the disassembled configuration, the connecting elements may be further flexed towards each other, by engagement with a blocking element arranged adjacent to the opening of the common cavity, into a second deformed configuration, in which the connecting elements may be flexed towards each other by a second degree greater than said first degree against a second biasing force greater than the said first biasing force. The blocking element adjacent to the opening of the common cavity may present a stop preventing withdrawal of the carrying elements from the cavity.

Figure 12:
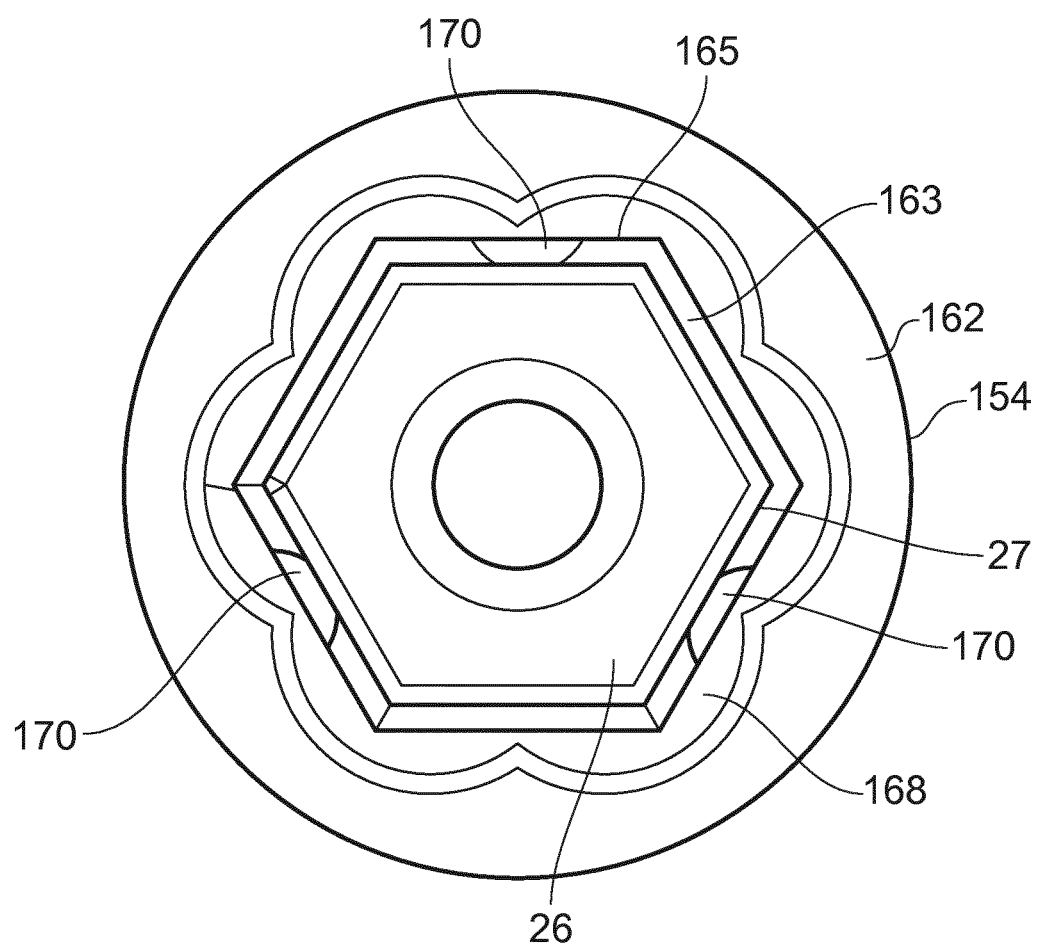
FIG. 12 shows an axial cross-section of a receiving bush of the coupling unit of FIG. 3 with an external driving member received therein.

FIG. 12 shows the main coupling body 154 of the second coupling member 150 in a cross section taken perpendicularly to the second central axis 152, together with the rotatable driving member 26 received in the receiving bush 162 of the main coupling body 154. As shown, the receiving bush 162 defines an internal polygonal surface 165 having six sides, so that the receiving bush 162 has a hexagonal opening in cross-section. The rotatable driving member 26 has a corresponding geometrically similar external polygonal surface 27 having six sides. As shown in FIG. 12, there is a clearance 163 between the external polygonal surface 27 of the rotatable driving member 26 and the internal polygonal surface 165 of the receiving bush 162.

The receiving bush 162 comprises three rounded protrusions 170 that extend radially inwardly towards the second central axis 152 by an amount corresponding to the clearance 163 between the external polygonal surface 27 of the rotatable driving member 26 and the internal polygonal surface 165 of the receiving bush 162. The three rounded protrusions 170 are configured to engage the external polygonal surface 27 of the rotatable driving member 26. In this example, the three rounded protrusions 170 are regularly angularly spaced apart, i.e. at angular intervals of 120° about the second central axis 152. The minimum angular extent of an arc through each rounded protrusion 170 about the second central axis 152 is over 180° so that the rounded protrusions can cooperate to retain the rotatable driving member 26. In this example, the angular extent of the arc through each of the rounded protrusions 170 is 240° about the second central axis 152, as the rounded protrusions 170 are evenly angular spaced at 120° intervals.

In this example, the rounded protrusions 170 are located at an axial location of the receiving bush 162 corresponding to a midpoint of the axial extent of the receiving bush 162. The protrusions enable the receiving bush 162 to engage the external polygonal surface 27 of the rotatable driving member 26 whilst maintaining the clearance 163 between the external polygonal surface 27 of the rotatable driving member 26 and the internal polygonal surface 165 of the receiving bush 162. The clearance 163 may permit the second coupling member 150 to easily receive and engage the rotatable driving member 26, and allows slight misalignments between the rotatable driving member 26 and the receiving bush 162.

In particular, owing to the clearance 163, the external polygonal surface 27 of the rotatable driving member 26 need not be perfectly angularly aligned with the internal polygonal surface 165 of the receiving bush 162 during coupling of the functional attachment 14 onto the actuator unit 12. Further, owing to the clearance 163, the second central axis 152 need not be perfectly coaxial with the actuator axis 24. The receiving bush 162 may act as a guide once a first end of the rotatable driving member 26 is received in the receiving bush 162, so that as the rotatable driving member 26 moves axially further into the receiving bush 162, the receiving bush 162 and/or the rotatable driving member 26 move into mutually alignment with respect to relative angular orientation, i.e. about the actuator axis 24, and/or with respect to axial alignment, i.e. whether the second central axis 152 is tilted or coaxial with respect to the actuator axis 24. When the first end of the rotatable driving member 26 abuts the rounded protrusions 170, they cooperate to angularly align the rotatable driving member 26 and the receiving bush 162.

In this example the opening of the receiving bush 162 has a chamfered edge 168 (also shown in FIGS. 3 and 4) to guide the first end of the rotatable driving member 26 into the receiving bush 162.

Figure 13:
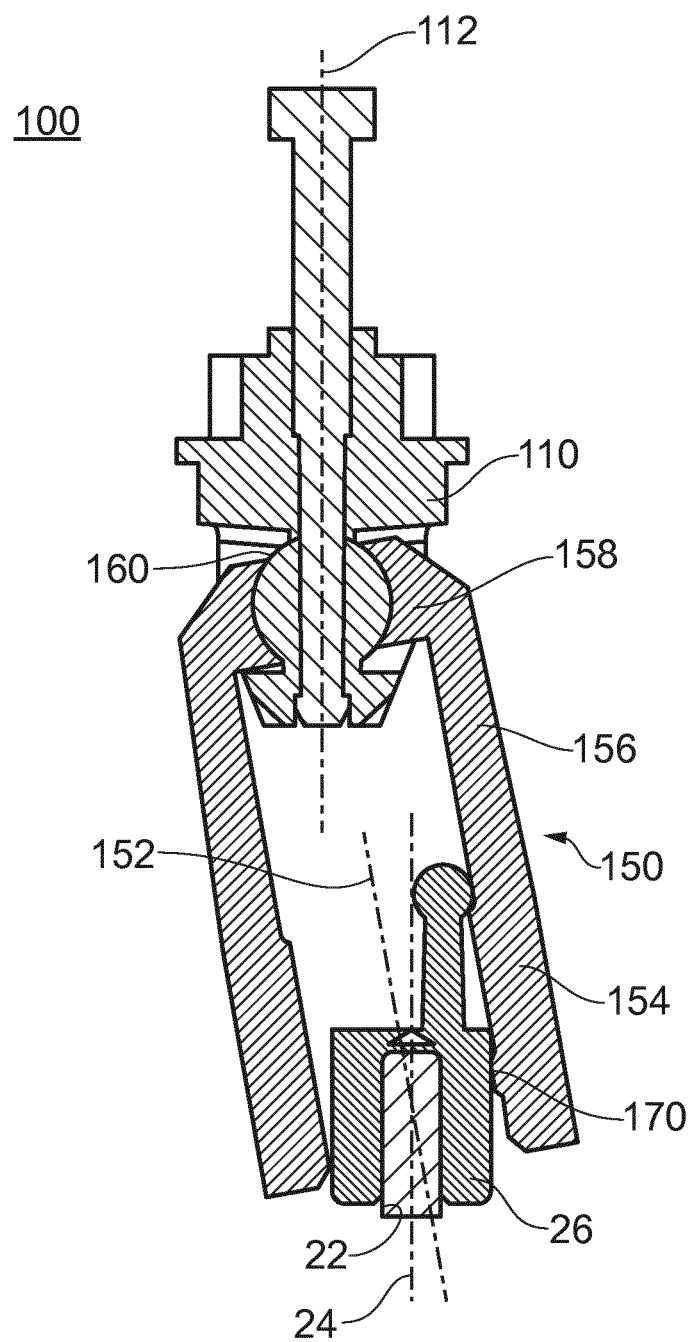
FIG. 13 shows a cross-section of the coupling unit of FIG. 3 in the assembled configuration together with an external driving member.

FIG. 13 shows the coupling unit 100 in cross-section with the rotatable driving member 26 received in the receiving bush 162 and with the first and second coupling members 110, 150 in the assembled configuration. As shown in FIG. 13, the rotatable driving member 26 is laterally offset with respect to the first coupling member 110. Such an offset may arise, for example, due to displacement of the first coupling member 110 within the functional attachment 14 when the rotary components of the functional attachment 14 are mounted to the attachment housing 28 by way of an elastic suspension member 52 as discussed here before and schematically shown in FIG. 1.

In the example of FIG. 13, the second coupling member 150 is pivoted relative the first coupling member 110 so that the second central axis 152 is angularly offset with respect to the first central axis 112. In this particular example, the actuator axis 24 through the rotatable driving member 26 is substantially parallel with the first central axis 112 and is therefore angularly offset with respect to the second central axis 152. As there is a clearance between the internal polygonal surface of the receiving bush 162 and the external polygonal surface of the rotatable driving member 26, a limited range of angular offset (for example 5°) is permitted whilst the three rounded protrusions 170 of the receiving bush 162 engage the rotatable driving member 26 for transmission of a rotary driving force. The rounded protrusions 170 may comprise a resilient (elastically deformable) material.

A coupling unit as disclosed herein may be simple to manufacture, because during manufacturing and assembly of the coupling unit the first and second coupling members may be simply snap-fitted together and prevented from disengaging.

When assembled and used to transmit a rotary driving force in a personal care device, a coupling unit as disclosed herein may enable simple and convenient attachment of a functional attachment of the personal care device onto an actuator unit of the personal care device by a user. The coupling unit may permit simple and convenient attachment of a driving member of a rotary transmission in the actuator unit, e.g. the rotatable driving member of the actuator, to the driven component in the functional attachment, e.g. the receiving bush of the functional attachment, by the user. A coupling unit as disclosed herein may be part of a functional attachment which can be releasably attached to an actuator unit of a personal care device, as disclosed in the examples described here before. Alternatively, a coupling unit as disclosed herein may be part of an actuator unit of a personal care device, onto which one or more functional attachments can be selectively and releasably attached. In each of these alternatives, either the first coupling member or the second coupling member as described here before can be directly attached to a rotatable component of, respectively, the functional attachment or the actuator unit. It will be clear for the skilled person that, in embodiments wherein the second coupling member as described here before is attached to said rotatable component, the receiving bush as described here before will be part of the first coupling member. A coupling unit as disclosed herein may permit easy mutual attachment of a functional attachment and an actuator unit of a personal care device, even when the first central axis is misaligned with the actuator axis. In particular, a coupling as disclosed herein comprises a second coupling member having a second central axis which may pivot with respect to the first central axis and/or the actuator axis, whilst enabling the transmission of rotary driving force from the actuator unit to the first coupling member.

Further, when the coupling unit permits relative radial movement between the first and second coupling members, this may further facilitate easy attachment by the user of the functional attachment onto the actuator unit. In particular, the second coupling member may rotate about the first central axis relative the first coupling member to permit ease of insertion of a rotatable driving member of the actuator unit into a receiving bush of the second coupling member.

Although an example has been described in which the first coupling member has two curved first bearing surface segments and the second coupling member has two corresponding second bearing surface segments provided on respective carrying elements of respective connecting arms, it should be appreciated that in other embodiments there may be three or more first bearing surface segments and a corresponding number of second bearing surface segments.

Although an embodiment has been described in which carrying elements of a second coupling member fit in respective recesses of a first coupling member, it will be appreciated that in other embodiments the first coupling member may not have a recessed profile.

Coupling units as described herein may be provided in actuator units or functional attachments for a variety of personal care devices, such as a rotatable epilation system, a rotatable hair-cutting system, and a rotatable callus-removal system.

The invention claimed is:

1. A hair clipper comprising:
a cutting unit;
an actuator unit; and
a coupling unit for transmission of a rotary driving force, wherein the coupling unit comprises:
a first coupling member having a curved first bearing surface;
a second coupling member having a main coupling body and a curved second bearing surface engaging the first bearing surface thereby enabling rotation of the second coupling member relative to the first coupling member, wherein:
the second bearing surface is arranged at a distance from the main coupling body and comprises at least two curved second bearing surface segments which each engage the first bearing surface,
the second coupling member comprises at least two carrying elements, which are each provided with a respective one of the at least two second bearing surface segments, and at least two connecting elements, which each connect a respective one of the at least two carrying elements with the main coupling body,
the first coupling member comprises a blocking element arranged between the first bearing surface and the main coupling body,
at least one of the at least two connecting elements comprises an elastically deformable material in a first deformed condition providing a first biasing force urging the at least two second bearing surface segments into contact with the first bearing surface,
the blocking element is configured to prevent passage of the at least two carrying elements along the blocking element at least in the first deformed condition of the elastically deformable material, and
the elastically deformable material is provided such that, in a second deformed condition of the elastically deformable material, the elastically deformable material provides a second biasing force larger than the first biasing force and the at least two carrying elements are able to pass along the blocking element.

2. The hair clipper as claimed in claim 1, wherein the blocking element comprises, at an end facing the main coupling body, at least one sloped surface facing the at least one of the at least two connecting elements comprising the elastically deformable material.

3. The hair clipper as claimed in claim 1, wherein the first bearing surface comprises at least two curved first bearing surface segments which each engage a respective one of the at least two second bearing surface segments.

4. The hair clipper as claimed in claim 3, wherein the at least two first bearing surface segments are each spherical portion and have a common center point.

5. The hair clipper as claimed in claim 3, wherein the first coupling member comprises a first central axis, wherein the first bearing surface comprises two curved first bearing surface segments arranged diametrically opposite each other with respect to the first central axis and facing away from each other, wherein the second coupling member comprises a second central axis, and wherein the second bearing surface comprises two curved second bearing surface segments arranged diametrically opposite each other with respect to the second central axis and facing towards each other.

6. The hair clipper as claimed in claim 5, wherein the two second bearing surface segments are each provided on a respective one of two carrying elements, wherein the two carrying elements are each provided on an end portion of a respective one of two connecting elements, wherein the two connecting elements:
each comprises the elastically deformable material;
each has the shape of an elongate arm; and
are arranged diametrically opposite each other with respect to the second central axis;
and wherein the blocking element comprises, at an end facing the main coupling body, two sloped surfaces which are arranged diametrically opposite each other with respect to the first central axis and which each face a respective one of the two connecting elements.

7. The hair clipper as claimed in claim 3, wherein the first coupling member comprises at least one abutment element arranged to abut against at least one of the at least two carrying elements under influence of the rotary driving force exerted on the first or the second coupling member.

8. The hair clipper as claimed in claim 7, wherein the at least one abutment element is arranged adjacent to and protrudes relative to at least one of the at least two first bearing surface segments.

9. The hair clipper as claimed in claim 7, wherein the first coupling member comprises at least two abutment elements of the at least one abutment element arranged to abut against a respective one of the at least two carrying elements under influence of the rotary driving force.

10. The hair clipper as claimed in claim 7, wherein the first coupling member comprises two abutment elements of the at least one abutment element which are each arranged to abut against one of the at least two carrying elements under influence of, respectively, a first rotary driving force exerted on the first or the second coupling member in a first rotational direction and a second rotary driving force exerted on the first or the second coupling member in a second rotational direction opposite to the first rotational direction.

11. The hair clipper as claimed in claim 10, wherein said one of the at least two carrying elements is arranged with a clearance between said two abutment elements.

12. The hair clipper as claimed in claim 1, wherein the at least one of the at least two connecting elements comprising the elastically deformable material has the shape of an elongate arm.

13. The hair clipper as claimed in claim 1, wherein one of the first and second coupling members is provided with a receiving bush having an internal polygonal surface for receiving a driving member having a corresponding external polygonal surface and providing a rotary driving force, wherein the receiving bush comprises at least three rounded protrusions which are each provided on a respective one of at least three different sections of the internal polygonal surface.

14. The hair clipper as claimed in claim 1, further comprising a attachment and an attachment housing, wherein the cutting unit is rotatable relative to the attachment housing, and the coupling unit receives the rotary driving force from a driving member and transmits said rotary driving force to the cutting unit.

15. The hair clipper as claimed in claim 14, wherein the cutting unit is mounted to the attachment housing by means of an elastic suspension member.

16. The hair clipper as claimed in claim 14, wherein the cutting unit comprises a rotatable epilation system, a rotatable hair-cutting system, or a rotatable callus-removal system.

17. The hair clipper as claimed in claim 14, wherein the actuator unit accommodates an actuator, which is connected to the driving member to provide the rotary driving force to the driving member, and a first coupling structure, wherein the functional attachment has a second coupling structure which can be coupled to and released from the first coupling structure and wherein the coupling unit of the functional attachment is configured to receive the rotary driving force from the rotatable driving member when the second coupling structure is coupled to the first coupling structure.

* * * * *